(12) United States Patent
Gaultney et al.

(10) Patent No.: US 8,025,259 B2
(45) Date of Patent: Sep. 27, 2011

(54) BAG HANGER DEVICE AND BAG FOR PRODUCT DISPENSING SYSTEM FOR MATERIALS

(75) Inventors: Lawrence Doka Gaultney, Elkton, MD (US); Louis G. Rosanio, Wilmington, DE (US); David Carlton Visser, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 326 days.

(21) Appl. No.: 12/430,935

(22) Filed: Apr. 28, 2009

(65) Prior Publication Data

US 2009/0272858 A1 Nov. 5, 2009

Related U.S. Application Data

(60) Provisional application No. 61/050,346, filed on May 5, 2008.

(51) Int. Cl.
*B65B 67/04* (2006.01)
*B65D 33/34* (2006.01)

(52) U.S. Cl. .............. 248/99; 248/95; 383/22; 141/314; 222/181.1

(58) Field of Classification Search ..................... 248/95, 248/99, 100, 101, 317, 318; 222/181.1, 181.2, 222/181.3, 185.1; 141/314, 316, 10; 414/414, 414/415; 383/9, 12, 22, 23, 33, 109
See application file for complete search history.

(56) References Cited

U.S. PATENT DOCUMENTS

| | | | | |
|---|---|---|---|---|
| 1,437,876 A | * | 12/1922 | Tyler | 141/315 |
| 3,789,897 A | | 2/1974 | Saito | |
| 3,924,781 A | * | 12/1975 | Witte | 222/181.3 |
| 3,961,655 A | * | 6/1976 | Nattrass et al. | 383/109 |
| 4,182,386 A | * | 1/1980 | Alack | 141/314 |
| 4,194,652 A | * | 3/1980 | Williamson et al. | 222/181.3 |
| 4,445,658 A | * | 5/1984 | Ferron | 248/99 |
| 4,479,243 A | | 10/1984 | Derby et al. | |
| 5,069,596 A | * | 12/1991 | Mueller et al. | 414/412 |
| 5,184,759 A | * | 2/1993 | Gill et al. | 222/181.3 |
| 5,333,757 A | * | 8/1994 | Volk et al. | 222/181.3 |
| 5,738,153 A | | 4/1998 | Gerling et al. | |
| 5,741,093 A | * | 4/1998 | Schonberg et al. | 406/153 |
| 6,042,063 A | * | 3/2000 | Kerr et al. | 248/100 |
| 6,352,178 B1 | | 3/2002 | Kimoto et al. | |
| 7,075,019 B2 | | 7/2006 | Bergman et al. | |
| 7,223,058 B2 | * | 5/2007 | Nyhof | 414/415 |

FOREIGN PATENT DOCUMENTS

WO WO02/088000 11/2002

* cited by examiner

*Primary Examiner* — Tan Le

(57) ABSTRACT

A bag hanger device for holding a flexible bag containing a flowable material having
 a multi-sided, D-shaped or circular frame;
 a cross-member having two ends wherein one end is attached to one side of the frame and an opposite end is unattached to the frame;
 a closing device attached to an opposite end of the cross-member;
 a locking device attached to the frame opposite the closing device and in alignment with the closing device attached to the cross-member;
 at least one hanging means attached to the cross-member for holding the bag hanger device and a flexible bag attached thereto in a dispensing system;
wherein the bag hanger device when inserted into the flexible bag having at least one pocket enables engagement of the closing device with the locking device and holds the flexible bag in a position to prevent collapse, wrinkling or deformation of the flexible bag.

23 Claims, 10 Drawing Sheets

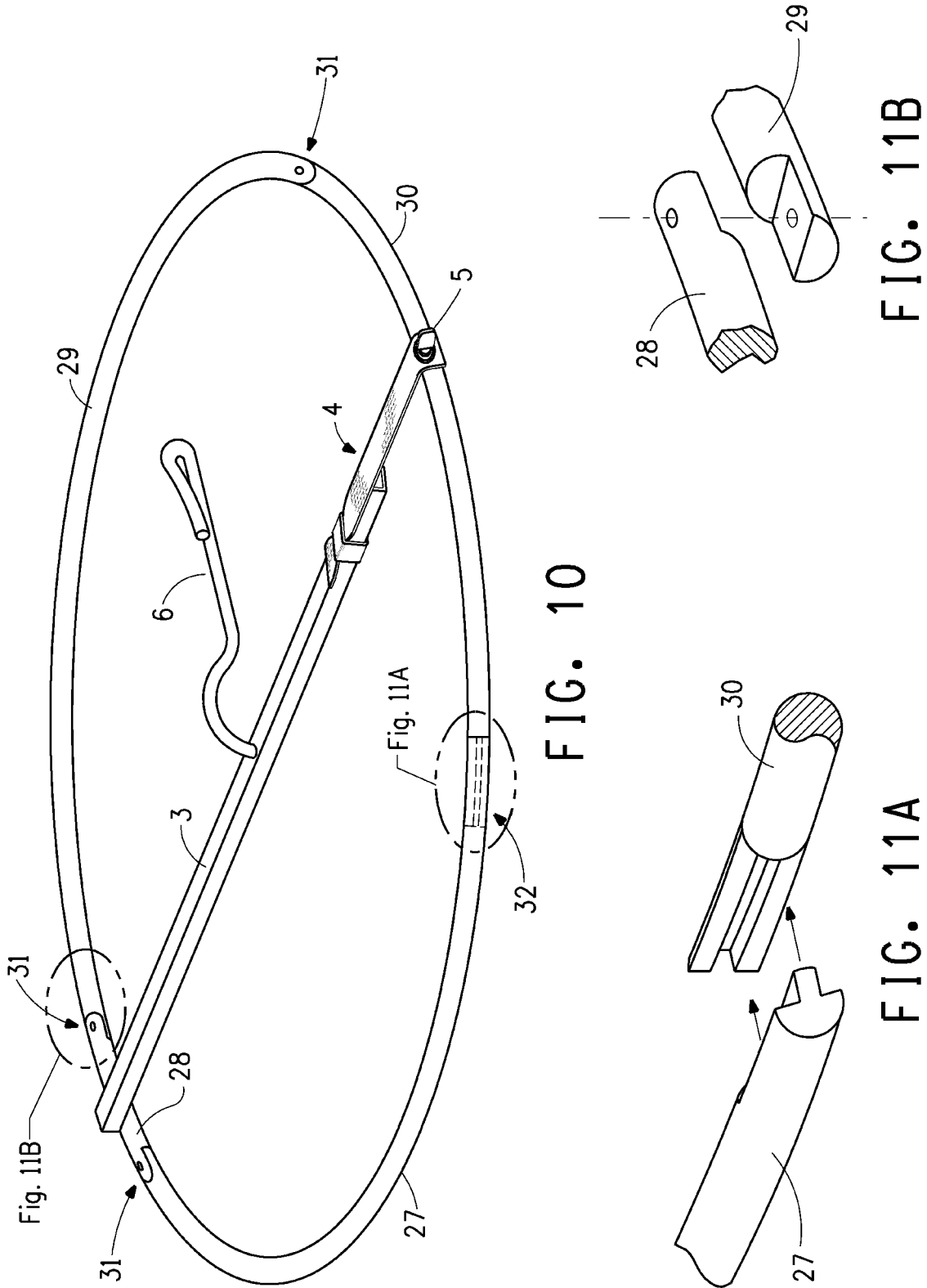

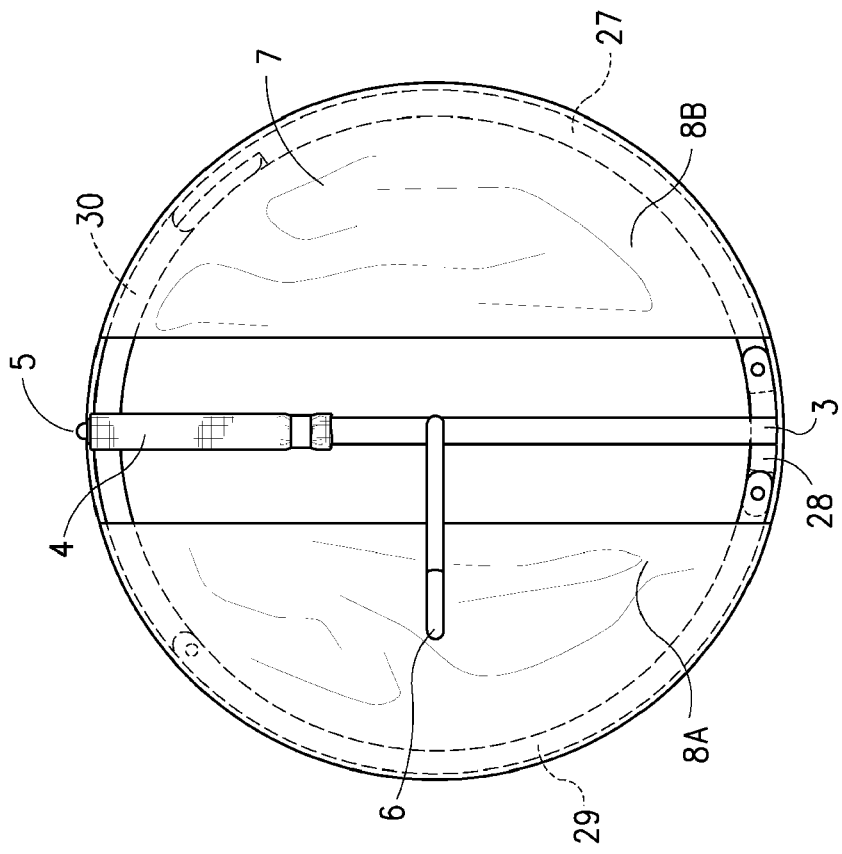
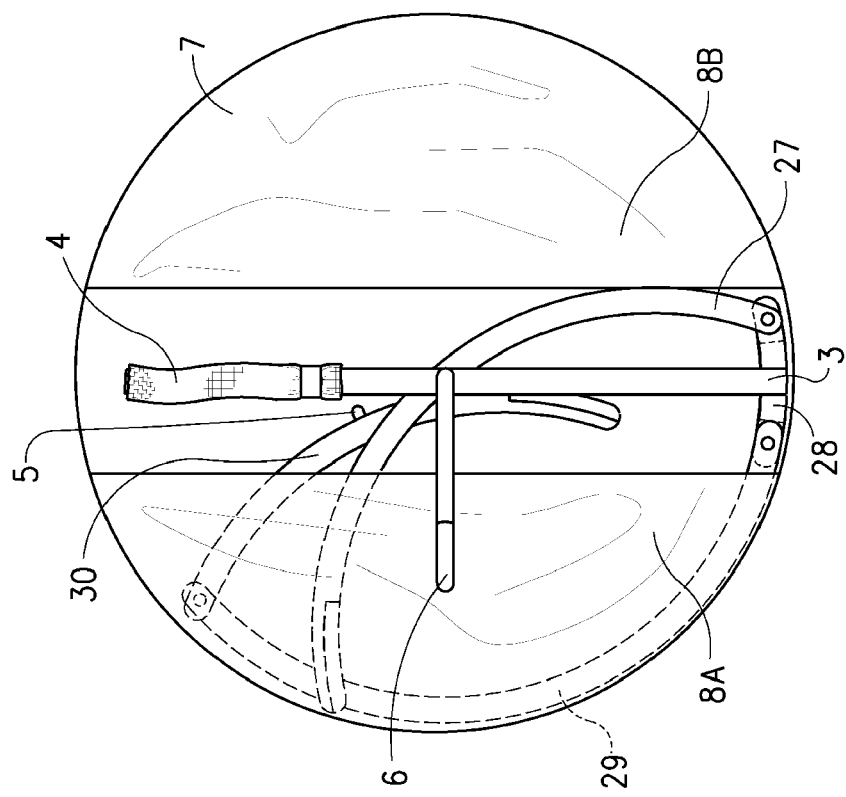
FIG. 12A
FIG. 12B

BAG HANGER DEVICE AND BAG FOR PRODUCT DISPENSING SYSTEM FOR MATERIALS

FIELD OF THE INVENTION

The present invention relates to a bag hanger device and a flexible bag used in a dispensing system for flowable materials and in particular for granular agricultural products.

BACKGROUND OF THE INVENTION

Currently, granular agricultural products are shipped in bulk containers to regional distribution centers and there dispensed into smaller containers to be sold to consumers. Typical bulk handling dispensing systems are shown in U.S. Pat. Nos. 5,738,153 and 7,075,019. It has been the practice to ship the granular materials in large rigid plastic containers which are then installed in the dispensing system and the granular material is metered out to small containers. However, these containers after use must be shipped back to the manufacturer and there thoroughly cleaned to prevent cross contamination of ingredients which considerably increases the cost for reuse of such containers. Large bags have also been used in place of the plastic containers. Typically, these bags have hanging straps which allow the bags to be hung in the dispensing device. But these bags, particularly large size bags for example holding fifty to several hundred pounds of granular material, are very difficult to install in the dispensing device and the hanging straps may break or tear particularly in those bags containing a large quantity of material. Also, the design of the bag with hanging straps allows the bag to partially collapse as the granular material is emptied from the bag into containers in the dispensing process. This causes granular material to be trapped and retained in the bag. Often these granular materials are agricultural products that can be expensive, where even a small amount of waste is not acceptable. Also, certain granular materials may present a hazard and such materials must be removed from the bag before it is sent to a disposal site. Similar problems occur for liquid materials that are dispensed in this manner.

There is a need for a bag and a bag hanger device that can be used to easily install the bag in a dispensing system in such a manner that the bag hanger device keeps the bag from collapsing or wrinkling thus preventing the trapping of any material being dispensed.

SUMMARY OF THE INVENTION

According to one aspect of the present invention there is provided a bag hanger device for holding a flexible bag containing a flowable material, comprising:
a frame having multiple sides;
a cross-member having two ends wherein one end is attached to one side of the frame and an opposite end is unattached to the frame;
a closing device attached to the opposite end of the cross-member;
a locking device attached to the frame opposite the closing device and in alignment with the closing device attached to the cross-member;
at least one hanging means attached to the cross-member for holding the bag hanger device and a flexible bag attached thereto in a dispensing system;
wherein the bag hanger device when inserted into the flexible bag having a pocket therein with the cross-member positioned outside of the pocket and the pocket having an opening for the locking device thereby providing for engagement of the closing device with the locking device and thereby holding the flexible bag in a position to prevent collapse, wrinkling or deformation of the flexible bag.

According to another aspect of the present invention there is provided a bag hanger device for holding a flexible bag containing a flowable material, comprising:
a frame having multiple sides;
a cross-member having two ends wherein one end is attached to one side of the frame and an opposite end is unattached to the frame;
a closing mechanism device attached to the opposite end of the cross-member comprising a pivotable hook assembly which comprises a hook capable of engagement with the frame;
at least one hanging means attached to the cross-member for holding the bag hanger device and a flexible bag attached thereto in a dispensing system;
wherein the bag hanger device when inserted into the flexible bag having a pocket therein with the cross-member positioned outside of the pocket and the pocket having an opening to allow the hook to engage with the frame thereby providing for engagement of the hook with the frame and thereby holding the flexible bag in a position to prevent collapse, wrinkling or deformation of the flexible bag.

According to another aspect of the present invention there is provided a bag hanger device for holding a flexible bag containing a flowable material, comprising:
a circular frame;
a cross-member having two ends wherein one end is attached to one side of the circular frame and an opposite end is unattached to the circular frame;
a closing device attached to the opposite end of the cross-member;
a locking device attached to the circular frame opposite the closing device and in alignment with the closing device attached to the cross-member;
at least one hanging means attached to the cross-member for holding the bag hanger device and a flexible bag attached thereto in a dispensing system;
wherein the bag hanger device when inserted into the flexible bag having two apposing pockets therein with the cross-member and the locking device positioned outside of the two apposing pockets within an opening disposed between the two apposing pockets thereby providing for engagement of the closing device with the locking device and thereby holding the flexible bag in a position to prevent collapse, wrinkling or deformation of the flexible bag.

A further aspect of the present invention is provided by a flexible bag having at least one pocket therein and opposite the at least one pocket having an outlet for dispensing a flowable material wherein a bag hanger device, as described by any of the above, is inserted into the at least one pocket.

Another aspect of the present invention is provided by a flexible bag hanging system comprising a flexible bag and a bag hanger device, the flexible bag comprising at least one pocket disposed at the top of the flexible bag, an outlet disposed at the bottom of the flexible bag for dispensing a flowable material, and having a multi-sided, circular-shaped or D-shaped configuration; the bag hanger device comprising a frame having a configuration capable of insertion in the at least one pocket of the flexible bag, a cross-member having two ends wherein one end is attached to one side of the frame and an opposite end is unattached to the frame, a closing device attached to the opposite end of the cross-member, a locking device attached to the frame opposite the closing device and in alignment with the closing device attached to the cross-member; and the frame being disposed within the pocket with the cross-member positioned outside of the pocket and the locking device disposed through an opening for engagement with the closing device.

A further aspect of the present invention is provided by a method of hanging a flexible bag comprising the steps of:

inserting a first part of a bag hanger device into a pocket of a flexible bag having an opening therein, the first part comprising a frame and a locking device, the locking device passing through the opening;

placing a second part of the bag hanger device outside the pocket of the flexible bag, the second part comprising a cross-member having two ends wherein one end is attached to one side of the frame and an opposite end is unattached to the frame and has a closing device attached thereto; and engaging the closing device and the locking device.

BRIEF DESCRIPTION OF THE FIGURES

FIG. 10 is a perspective view of the circular-shaped bag hanger device.

FIG. 11A is a partial perspective view of a closing mechanism for the circular-shaped bag hanger device.

FIG. 11B is a partial perspective view of a connection between an arm and a bar that form part of the frame of the circular-shaped bag hanger device.

FIG. 12A is a top view of the circular-shaped bag hanger device as it is inserted into two apposing pockets of the flexible bag.

FIG. 12B is a top view of the circular-shaped bag hanger device in an expanded position inserted into two apposing pockets of the flexible bag.

DETAILED DESCRIPTION OF THE INVENTION

Figure 1A:
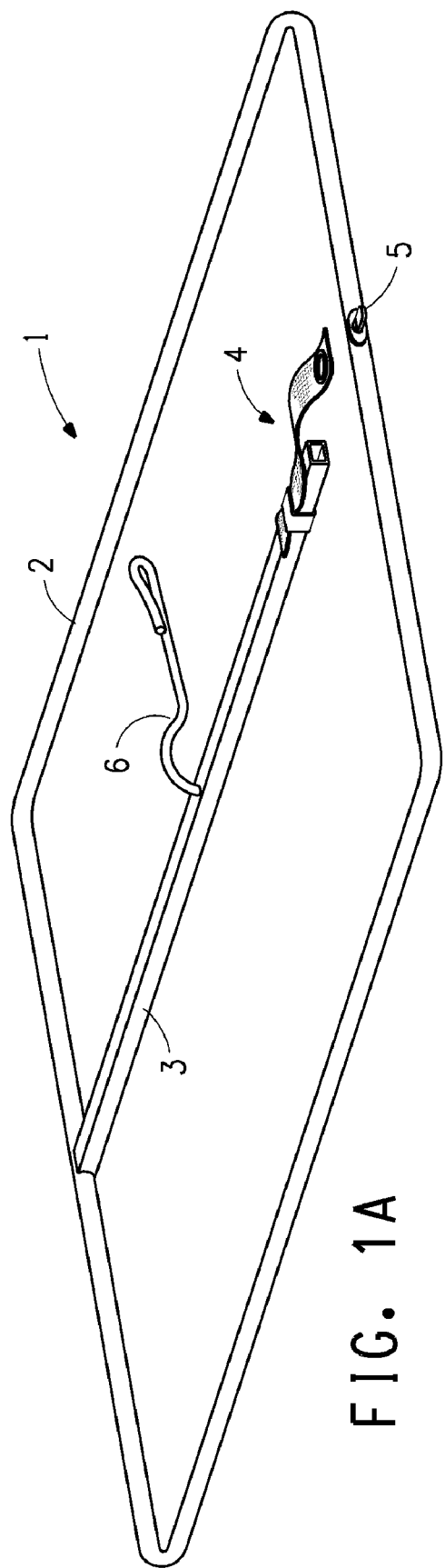
FIG. 1A is a perspective view of a bag hanger device for holding a flexible bag containing a flowable material in accordance with one aspect of the present invention.

The present invention is directed to a bag hanger device and a flexible bag for containing flowable material for use, in particular, in an agricultural product dispensing system. The present invention can be more fully understood from the figures and explanation thereof that provide details and preferred embodiments of the invention.

As used herein, the terms "comprises," "comprising," "includes," "including," "has," "having," "contains" or "containing," or any other variation thereof, are intended to cover a non-exclusive inclusion. For example, an apparatus, article, system, method or process that comprises a list of elements is not necessarily limited to only those elements but may include other elements not expressly listed or inherent to such apparatus, article, system, method or process. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

Embodiments of the present invention as described in the Summary of the Invention include:

Embodiment 1

A bag hanger device for holding a flexible bag containing a flowable material, as described in the Summary of the Invention, comprising a frame having multiple sides; a cross-member having two ends wherein one end is attached to one side of the frame and an opposite end is unattached to the frame; a closing device attached to the opposite end of the cross-member; a locking device attached to the frame opposite the closing device and in alignment with the closing device attached to the cross-member; at least one hanging means attached to the cross-member for holding the bag hanger device and a flexible bag attached thereto in a dispensing system; wherein the bag hanger device when inserted into the flexible bag having a pocket therein with the cross-member positioned outside of the pocket and the pocket having an opening for the locking device thereby providing for engagement of the closing device with the locking device and thereby holding the flexible bag in a position to prevent collapse, wrinkling or deformation of the flexible bag.

Embodiment 2

The bag hanger device of Embodiment 1 having two to five sides.

Embodiment 3

The bag hanger device of Embodiment 1 having four sides.

Embodiment 4

The bag hanger device of Embodiment 1 having two sides.

Embodiment 5

The bag hanger device of Embodiment 1 having three sides.

Embodiment 6

The bag hanger device of Embodiment 1 having five sides.

Embodiment 7

The bag hanger device of Embodiment 1 wherein the flexible bag is a plastic bag or a cloth bag.

Embodiment 8

The bag hanger device of Embodiment 7 wherein the flexible bag is formed from multilayered sheet material.

Embodiment 9

The bag hanger device of Embodiment 8 wherein the multilayered sheet material comprises a nylon layer, a low density polyethylene layer and an ethylene vinyl acetate polymer layer.

Embodiment 10

The bag hanger device of Embodiment 1 wherein the flowable material is a granular agricultural product.

Embodiment 11

The bag hanger device of Embodiment 1 wherein the flowable material is a liquid.

Embodiment 12

The bag hanger device of Embodiment 1 wherein the closing device and the locking device are replaced with a closing mechanism device attached to the opposite end of the cross-member and comprising a pivotable hook assembly having a hook capable of engagement with the frame thereby holding the flexible bag in a position to prevent collapse, wrinkling or deformation of the flexible bag.

Embodiment 13

A flexible bag having a pocket therein and opposite the pocket having an outlet for dispensing a flowable material wherein the bag hanger device of Embodiment 1 is inserted into the pocket.

Embodiment 14

The flexible bag of Embodiment 13 having a dispensing means positioned in or around the outlet for dispensing the flowable material.

Embodiment 15

The flexible bag of Embodiment 14 wherein the dispensing means comprises a valve assembly comprising a valve with portions thereof movable with respect to one another between an open position for dispensing the flowable material and a closed position for shutting off discharge of the flowable material and optionally capable of mating with the dispensing system in a product-specific manner.

Embodiment 16

The flexible bag of Embodiment 13 wherein the flexible bag is a plastic bag or a cloth bag.

Embodiment 17

The flexible bag of Embodiment 13 wherein the flexible bag is formed from a multilayered sheet material.

Embodiment 18

The flexible bag of Embodiment 17 wherein the multilayered sheet material comprises a nylon layer, a low density polyethylene layer and an ethylene vinyl acetate polymer layer.

Embodiment 19

The bag hanger device of Embodiment 1 wherein the frame is D-shaped having a straight section with each end of the straight section connected to opposite ends of a semicircular section.

Embodiment 20

A flexible bag having a pocket therein and opposite the pocket having an outlet for dispensing a flowable material wherein the bag hanger device of Embodiment 19 is inserted into the pocket.

Embodiment 21

The bag hanger device of Embodiment 1 wherein the frame is circular-shaped.

Embodiment 22

A flexible bag having two apposing pockets therein and opposite the two apposing pockets having an outlet for dispensing a flowable material wherein the bag hanger device of Embodiment 21 is inserted into the two apposing pockets of the flexible bag.

Embodiment 23

A flexible bag hanging system comprising, a flexible bag and a bag hanger device;
the flexible bag comprising at least one pocket disposed at the top of the flexible bag, an outlet disposed at the bottom of the flexible bag for dispensing a flowable material, and a multi-sided, circular-shaped or D-shaped configuration;
the bag hanger device comprising a frame having a configuration capable of insertion in the at least one pocket of the flexible bag, a cross-member having two ends wherein one end is attached to one side of the frame and an opposite end is unattached to the frame, a closing device attached to the opposite end of the cross-member, and a locking device attached to the frame opposite the closing device and in alignment with the closing device attached to the cross-member; and
the frame being disposed within the at least one pocket with the cross-member positioned outside of the at least one pocket and the locking device disposed through an opening in or adjacent to the at least one pocket for engagement with the closing device.

Embodiment 24

The bag hanging system of Embodiment 23 wherein the bag hanger device is according to any of Embodiments 1-12, 19 or 21 combined in any manner with the flexible bag of any of Embodiments 13-18, 20 or 22.

Embodiment 25

A method of hanging a flexible bag comprising the steps of:
inserting a first part of a bag hanger device into a pocket of a flexible bag having an opening therein, the first part comprising a frame and a locking device, the locking device passing through the opening;
placing a second part of the bag hanger device outside the pocket of the flexible bag, the second part comprising a cross-member having two ends wherein one end is attached to one side of the frame and an opposite end is unattached to the frame and has a closing device attached thereto; and
engaging the closing device and the locking device.

Embodiment 26

The method of Embodiment 25 wherein the bag hanger device is according to any of Embodiments 1-12, 19 or 21 combined in any manner with the flexible bag of any of Embodiments 13-18, 20 or 22.

FIG. 1A is a perspective view of a bag hanger device in accordance with one aspect of the present invention. Bag hanger device 1 has frame 2, which as shown is four-sided, which is a preferred embodiment. The frame can have a plurality of sides. A 2-, 3- or 5-sided frame is of note. Cross-member 3 is attached to one side of frame 2 wherein the opposite end of cross-member 3 is not attached to the frame. Attached to this opposite end of cross-member 3 is closing device 4 which after bag hanger device 1 is inserted into a pocket of a flexible bag is locked in place with locking device 5 attached to frame 2. Also attached to cross-member 3 is hanging means 6 shown as a curved rod which is used to hang the flexible bag in a dispensing system. Hanging means 6 can also be used as a handle for carrying the flexible bag after the bag hanger device has been inserted into the flexible bag.

Figure 1B:
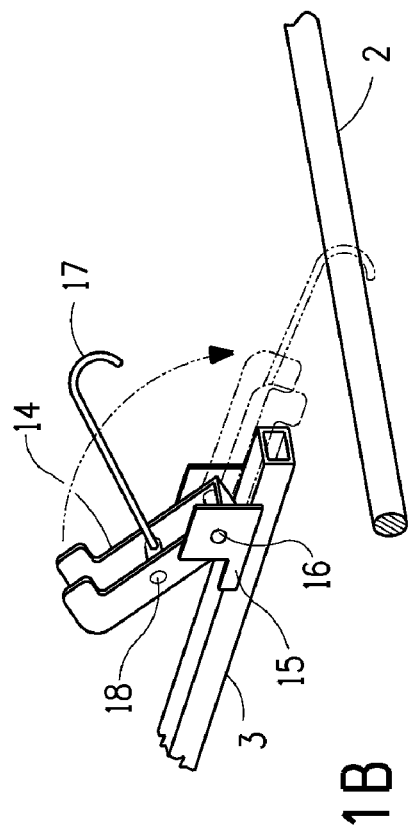
FIG. 1B is a perspective view of an alternative closing device for securing the flexible bag in accordance with another aspect of the present invention.

FIG. 1B is a perspective view of an alternative closing device that can be attached to cross-member 3 for holding the flexible bag in place on frame 2. Rotatable handle 14 is pivotably attached by bracket pin 16 to bracket 15 attached to cross-member 3. Hook mechanism 17 is pivotably attached to rotatable handle 14 by handle pin 18 and possesses a hook end for engagement with frame 2 in the engaged position as shown by the dashed lines of FIG. 1B.

Figure 2:
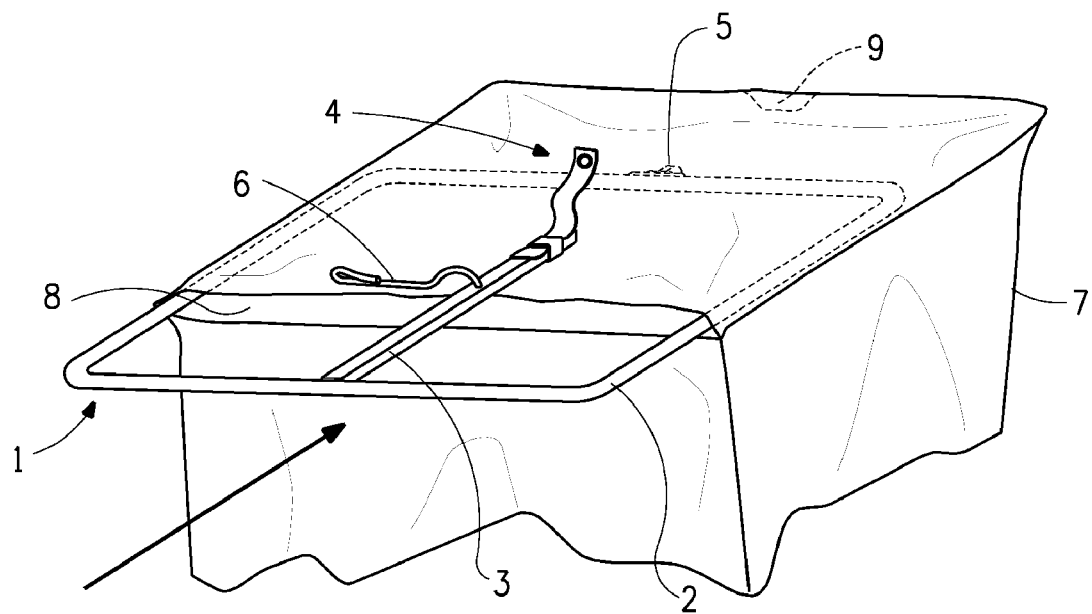
FIG. 2 is a perspective view of the bag hanger device being inserted into a pocket of a flexible bag in accordance with one aspect of the present invention.

FIG. 2 is a perspective view of bag hanger device 1 being inserted into flexible bag 7. By holding cross-member 3, bag hanger device 1 is inserted into pocket 8 of flexible bag 7. In the embodiment shown, cross-member 3 is slid over the top of pocket 8 of flexible bag 7. Locking device 5 (see FIG. 1A) passes through opening 9 in pocket 8 of flexible bag 7 thereby allowing closing device 4 attached to cross-member 3 attached to frame 2 to contact locking device 5. By engaging locking device 5 with closing device 4, flexible bag 7 is firmly held in place.

Figure 3:
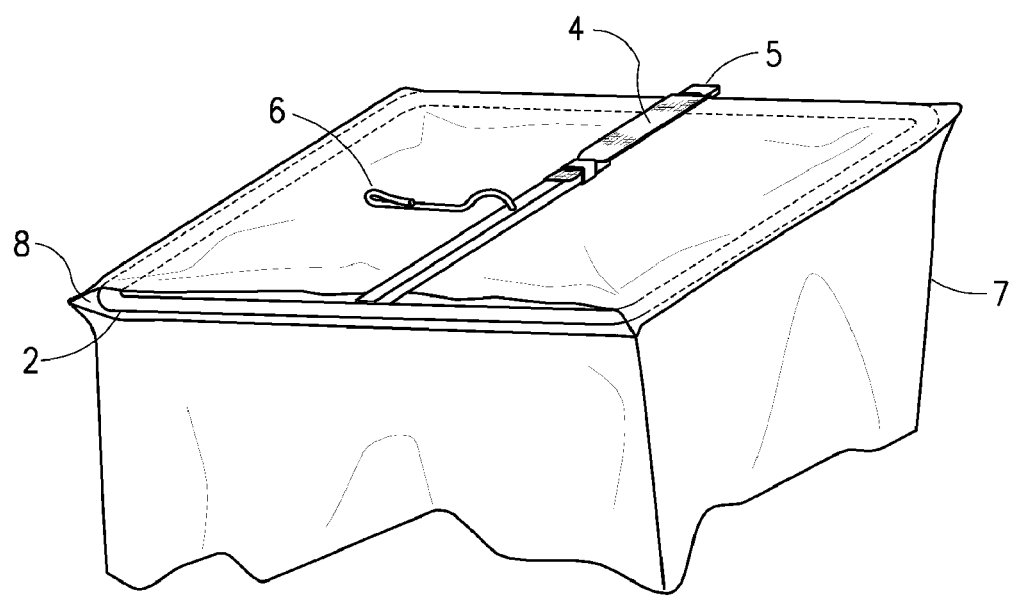
FIG. 3 is a perspective view of the bag hanger device after insertion into the flexible bag.

FIG. 3 is a perspective view of the bag hanger device after insertion into pocket 8 of flexible bag 7. Locking device 5 is in its unlocked position and closing device 4 is engaged with locking device 5. In another aspect of the present invention, the alternative closing device shown in FIG. 1B above can be used in place of the combination of closing device 4 and locking device 5.

Figure 4:
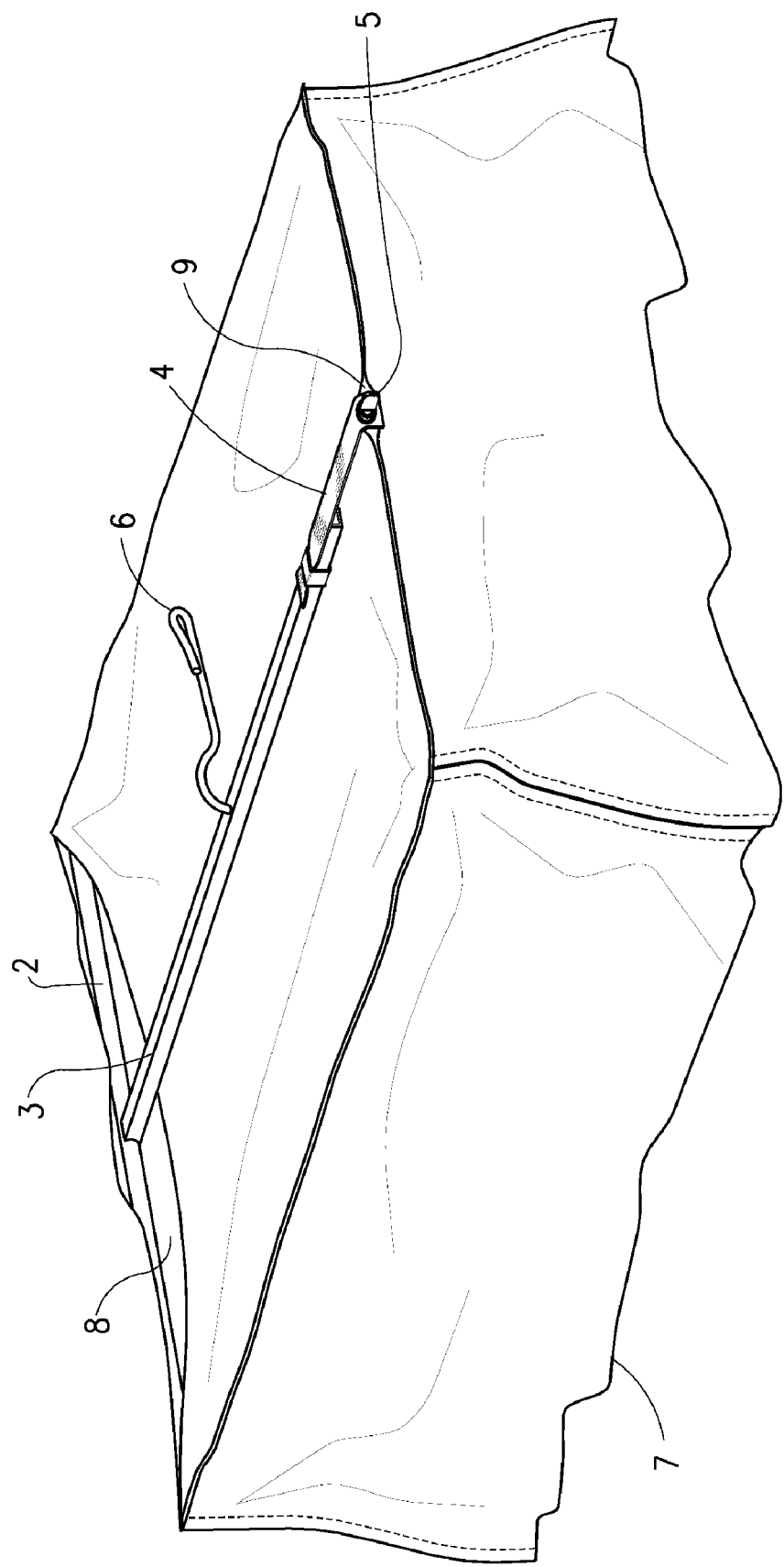
FIG. 4 is a perspective view of the bag hanger device after insertion into the flexible bag with a locking device secured to a closing device attached to a cross-member.

FIG. 4 is a perspective view of the bag hanger device after insertion into pocket 8 of flexible bag 7 having cross-member 3 attached to frame 2 positioned over the top of pocket 8 of flexible bag 7. Closing device 4 extending through opening 9 of flexible bag 7 is engaged with locking device 5 in its secure or locked position. Hanging means or handle 6 attached to cross-member 3 is shown.

Figure 5:
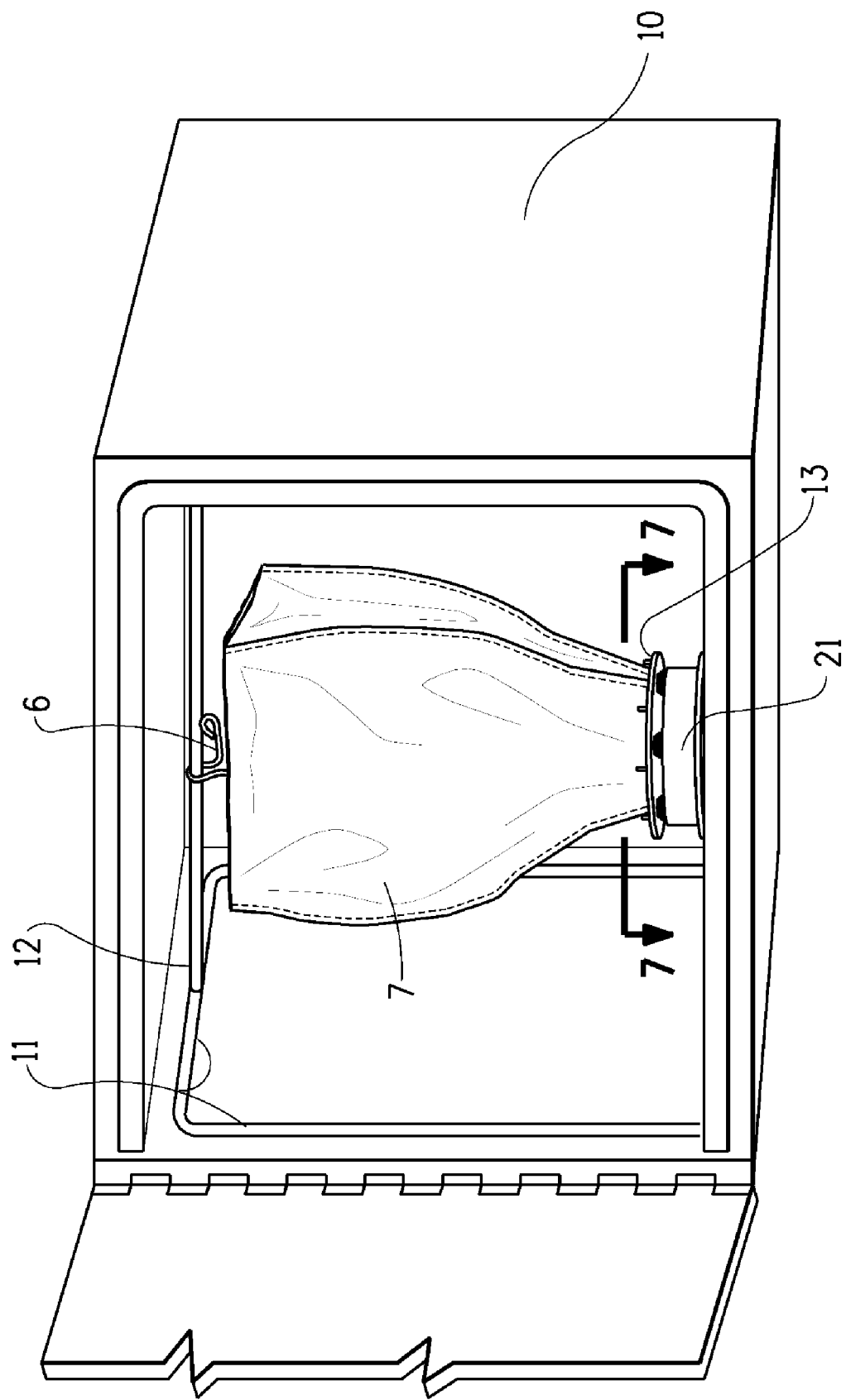
FIG. 5 is a perspective view in accordance with one aspect of the present invention which shows a bag hanger device inserted into a flexible bag and hung on a support structure within a dispensing system and shows the flexible bag mated to a dispensing means.

FIG. 5 is a perspective view of the bag hanger device inserted into flexible bag 7 and secured and hung on support structure 11 positioned in a system for dispensing flowable materials 10, particularly useful for granular agricultural products. Hanging means 6 is positioned in the pocket of flexible bag 7 and is hooked in place over support member 12 of support structure 11. At the bottom of flexible bag 7 is an outlet, and flexible bag 7 is held in place within dispensing system 10 by mating base plate 13 with system dispensing device 21.

Systems for dispensing flowable materials can include typical bulk handling dispensing devices which can be adapted to utilize the novel bag hanger device and flexible bag of the present invention. Such bulk handling dispensing devices are shown in U.S. Pat. Nos. 5,738,153 and 7,075,019.

The outlet at the bottom of flexible bag 7 can be attached or connected to a dispensing means. For example, plastic flexible bags can be heated sealed to dispensing means. A variety of dispensing means can be utilized. Such dispensing means can be very simple, for example, a string tied to keep the flexible bag closed when pulled off allows the flexible bag to open and flowable material to dispense from the flexible bag. A dispensing means of note is a valve assembly. A valve assembly can comprise a valve with portions thereof movable with respect to one another between an open position for dispensing the flowable material and a closed position for shutting off discharge of the flowable material. Thus the valve can be moved from the closed position to the open position allowing flowable material to dispense from the bag. Such a valve assembly will allow closing of the flexible bag when not in use. An iris type valve can be used wherein the iris can be adjusted to allow only a very small amount of flowable material to dispense or adjusted to its wide open position allowing free flow of the flowable material. Such a valve can also be closed when not in use. In FIG. 5 the outlet at the bottom of flexible bag 7 is shown attached to base plate 13 which comprises a valve assembly and is shown in use with system dispensing device 21 for dispensing flowable material from flexible bag 7.

Figure 7:
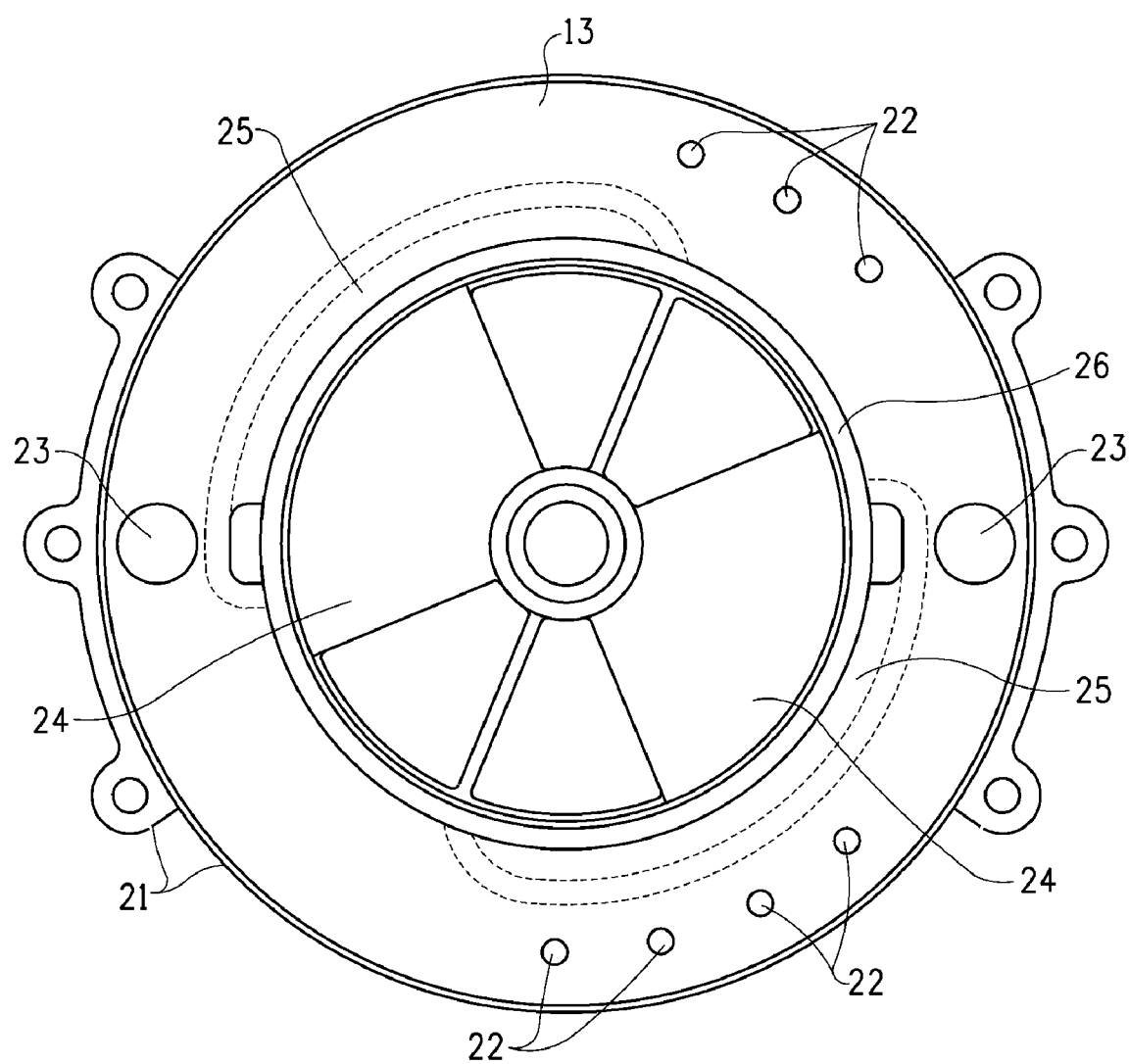
FIG. 7 is a top view taken along view lines 7-7 of FIG. 5 of a valve assembly used in dispensing flowable material from a flexible bag in accordance with one aspect of the present invention.

An example of a typical dispensing means is a dispensing device shown in FIG. 7 which is a valve assembly. FIG. 7 shows a top view of the valve assembly viewed at 7-7 (FIG. 5) that is used for dispensing a flowable material from flexible bag 7. The dispensing means comprises base plate 13 having holes 22 for pins attached to system dispensing device 21 for proper positioning and securing of flexible bag 7 within dispensing system 10. Such proper positioning and securing ensures that discharge of flowable material can take place without the risk of the flexible bag becoming separate from a receptacle which would be disposed beneath system dispensing device 21.

As different flowable materials can be contained within flexible bags, in a preferred embodiment of the present invention, each different flowable material is contained within a flexible bag to which is attached a dispensing means having a unique configuration, such as a series of pin placements (or alternatively holes), which is product-specific. Such pins (or holes) having matching holes (or pins) within a dispensing system and/or on a portion of a receptacle to which they can be mated, can ensure proper alignment of a flexible bag containing a particular product within the dispensing system and ensure accurate dispensing of the proper product. This can be particularly important when multiple flexible bags can be placed within a dispensing system at the same time for dispensing of one product into a receptacle or for dispensing a mixture of products into a receptacle. Base plate 13 is shown with two holes 23 for guide pins to hold the dispensing means in place while flowable material is being dispensed. Rotatable valve plates 24 are positioned in base plate 13 and opened and closed for the dispensing of the flowable material from flexible bag 7. Recessed ring opening area 26 is located adjacent to rotatable valve plates 24 that hold the ring positioned around the outlet of flexible bag 7 in place creating a seal thereby preventing leakage of the flowable material while the flowable material is being dispensed. Recessed area 25 is located in base plate 13 for the location of handles (not shown) attached to rotatable valve plates 24 for opening and closing of these plates.

Figure 6:
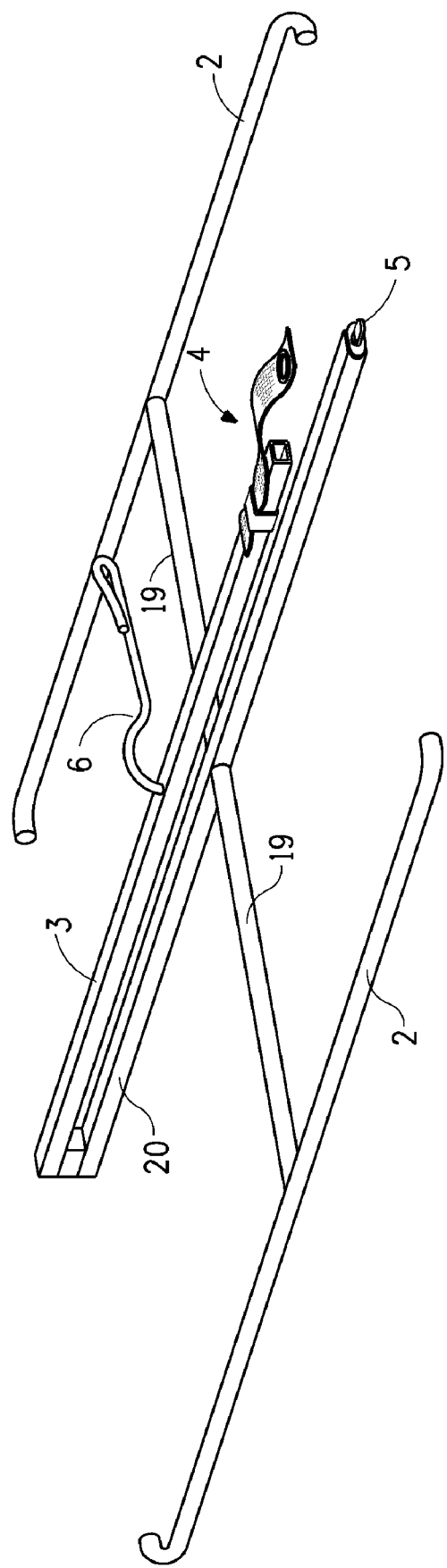
FIG. 6 is a perspective view of a bag hanger device having two sides in accordance with one aspect of the present invention.

FIG. 6 is a perspective view of a bag hanger device having two sides in accordance with another aspect of the present invention. Frame 2 forms two sides of the bag hanger device and are connected by second cross-member 19. The ends of each of the two sides of frame 2 are shown as having a right angle curve to allow for easy insertion of the bag hanger device into the pocket of the flexible bag. Typically, these right angle curves can be eliminated and are only present for convenient operation of this particular embodiment of the bag hanger device. Second cross-member 19 is attached to bar 20 to which locking device 5 is attached. Bar 20 is also attached to cross-member 3 to form a slot between bar 20 and cross-member 3 to allow for the top of the pocket of the flexible bag to slide between bar 20 and cross-member 3. Handle or hanging means 6 is attached to cross-member 3 as is closing device 4.

Figure 8:
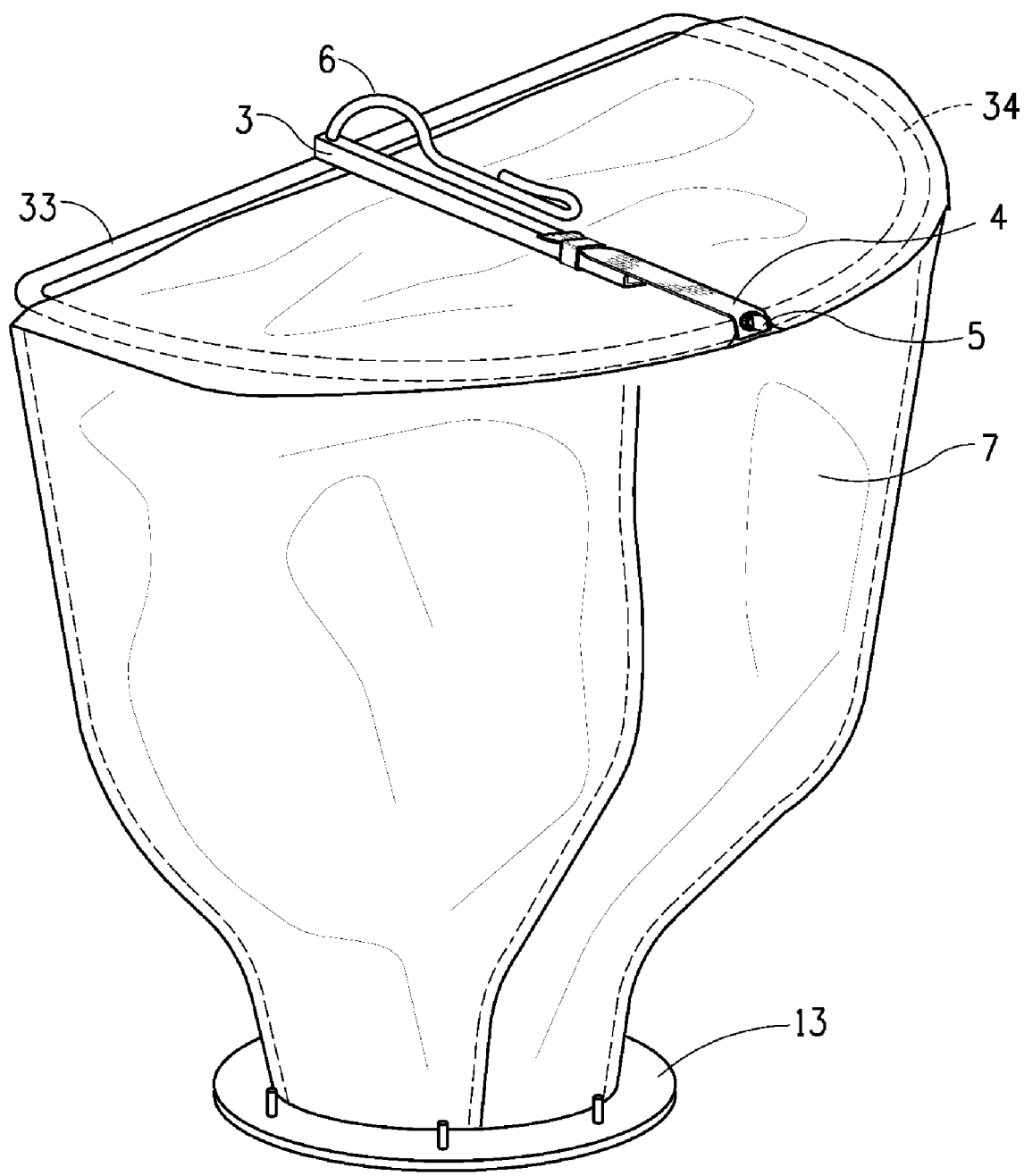
FIG. 8 is a perspective view of a D-shaped bag hanger device inserted into a flexible bag in accordance with one aspect of the present invention.

FIG. 8 is a perspective view of a flexible bag containing a D-shaped bag hanger device inserted into the pocket of flexible bag 7 in accordance with another aspect of the present invention. The D-shaped bag hanger device comprises straight section 33 both ends of which are connected to semicircular section 34. Semicircular section 34 is inserted into the pocket of flexible bag 7. Flexible bag 7 is attached to base plate 13. In the D-shaped bag hanger device, cross-member 3 is attached to the middle of straight section 33. Handle 6 is attached to cross-member 3 at the point cross-member 3 is attached to straight section 33. Closing device 4 is attached to the end of cross-member 3 and locking device 5 is attached to the center of semicircular section 34 and engages with closing device 4 to hold flexible bag 7 in place.

Figure 9:
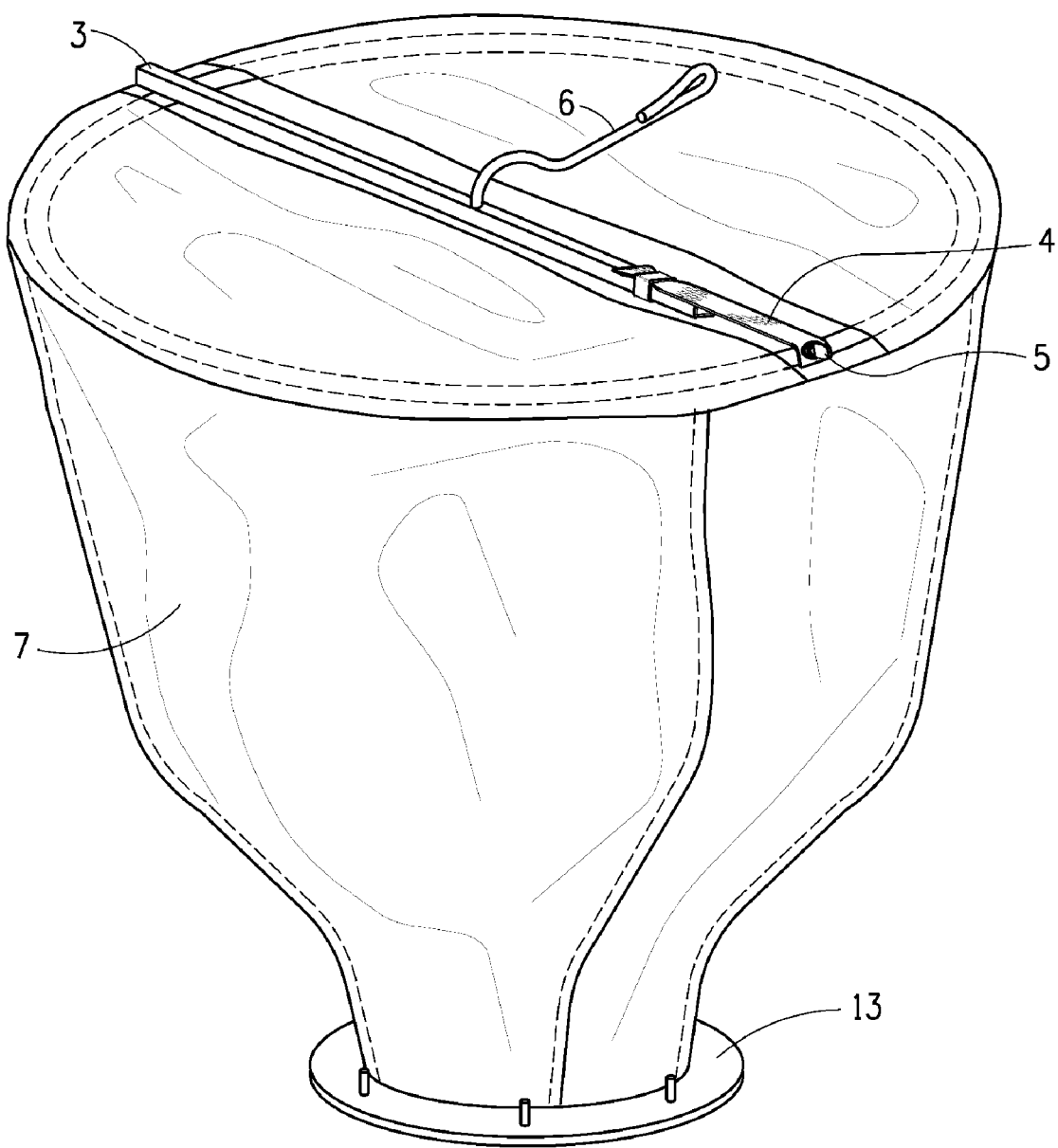
FIG. 9 is a perspective view of a circular-shaped bag hanger device inserted into a flexible bag in accordance with one aspect of the present invention.

FIG. 9 is a perspective view of a flexible bag having a circular-shaped bag hanger device inserted into two apposing pockets of flexible bag 7 in accordance with another aspect of the present invention. The circular bag hanger device, shown in detail in FIG. 10, is inserted into the two apposing pockets of flexible bag 7 which is attached to base plate 13. Cross-member 3 is attached at one end to the circular portion of the bag hanger device and has handle 6 attached at about the center of cross-member 3 and closing device 4 is attached to cross-member 3 and is engaged with locking device 5 attached to the circular portion of the bag hanger device to hold flexible bag 7 in place.

FIG. 10 is a perspective view of the circular shaped bag hanger device. In order to insert the circular shaped bag hanger device into a flexible bag, the bag hanger device must be collapsible as shown in FIG. 12A. The flexible bag has two apposing pockets and the bag hanger device in a partially collapsed form is inserted into a first pocket and then into a second pocket and expanded and moved in place. FIG. 10 shows the bag hanger device in its expanded form. The circular frame of the bag hanger device comprises right arm 27, pivot bar 28, left arm 29 and latch bar 30. When viewing the circular frame from the point where cross-member 3 is attached to pivot bar 28, right arm 27 of the circular frame is movably connected to pivot bar 28 which in turn is movably connected to left arm 29. Latch bar 30 is movably connected to left arm 29. The opposite end of latch bar 30 is engaged with the end of right arm 27 to securely latch the circular frame via latch joint 32. The recessed center of latch bar 30 is moved to engage with the protruding center of right arm 27 thereby engaging latch bar 30 and right arm 27. Cross-member 3 is attached to the center of latch bar 30 and hanger 6 is attached to the center of cross-member 3. Closing device 4 is attached to the unattached end of cross-member 3 and engaged with locking device 5 attached to the center of latch bar 30 of the circular frame.

FIG. 11A shows latch joint 32 and the engageability of latch bar 30 and right arm 27.

FIG. 11B shows an example of joint 31 that joins certain sections of the circular frame together. FIG. 11B shows how left arm 29 of the circular frame is brought into contact with pivot bar 28 and a pin (not shown) is inserted into the hole thereby connecting left arm 29 and pivot bar 28 in place and allowing movement of left arm 29 and pivot bar 28 so that the circular frame can be collapsed for insertion into the pockets of flexible bag 7 as shown in FIG. 12A. Similar joints 31 are shown in FIG. 10.

In FIG. 12A, flexible bag 7 has two apposing pockets, left-side pocket 8A and right-side pocket 8B. The circular frame in its folded position is inserted into the pockets. Left arm 29 of the frame is inserted first into left-side pocket 8A. Cross-member 3 having handle 6 in its center and closing device 4 on the unattached end is positioned in the center between left-side pocket 8A and right-side pocket 8B. Right arm 27 attached to pivot bar 28 is then positioned in right-side pocket 8B. FIG. 12B shows left arm 29 extended into left-side pocket 8A and latch bar 30 extended into right-side pocket 8B and right arm 27 positioned in latch bar 30 thereby firmly holding flexible bag 7 in place. Closing device 4 attached to cross-member 3 is engaged with locking device 5.

Typically flexible bags can be of any practical size. Small bags, e.g. holding only several pounds of flowable material, up to very large bags, e.g. holding several thousand pounds of material, can be used. Flexible bags can be made from cloth fabric, such as a woven or non-woven fabric of polyolefin fibers, such as polyethylene or polypropylene, polyamide, polyester and the like. The flexible bag can be formed from clear, opaque or colored plastic of polyethylene, polypropylene, copolymers and terpolymers of polyethylene and/or polypropylene, ethylene vinyl acetate polymers and copolymers and the like. Preferably, multilayered bags are used wherein each layer provides a specific level of protection to the flowable material. One preferred flexible bag is formed using a three-ply structure comprising a nylon film layer, a low density polyethylene (LDP) layer and an ethylene vinyl acetate polymer (EVA) layer. This particular structure can be used at high temperatures, such as up to 100° C., and at low temperatures, such as from 0 to −50° C., without deformation or stretching of the flexible bag or having the flexible bag become brittle, break or fracture. The pocket(s) for the flexible bag into which the bag hanger device is inserted can be sewn, heat sealed, or glued to the flexible bag and can be of the same material as the flexible bag or a different material. A flexible bag of the present invention can be reusable.

The frame and the cross-member of the bag hanger device can be fabricated from rigid material, such as metal, preferably stainless steel, and bent or machined to the desired shape and of sufficient strength to withstand the weight of flowable material held within a flexible bag hung from a bag hanger device without bending, losing shape or breaking. Alternatively the cross-member can be made from rigid or semi-rigid plastic material. The closing device and the locking device can be made from metal or strong flexible material that will not tear or pull apart.

A wide variety of flowable materials can be dispensed from the flexible bag and typically are either granular or liquid products. Typically granular agricultural products are dispensed, such as herbicides, insecticides, fungicides, fertilizers and the like, but other products, such as pharmaceuticals, inorganic or organic pigments, plastics, cosmetics, foods like dehydrated dairy products, seeds, animal feeds and the like can also be dispensed.

In utilization of the present invention, a bag hanger device is inserted into at least one pocket of a flexible bag containing flowable material, typically a dry granular solid agricultural product or a liquid product, locked in place and lifted by a handle or hanging means into a system for dispensing flowable material, and the hanging means is hooked onto a support member of a support structure positioned in a dispensing system. A dispensing means positioned in and/or around an outlet at the bottom of the flexible bag is mated to the dispensing system and holds the flexible bag in place. Product can then be dispensed from the flexible bag into a receptacle by the dispensing system. As product is dispensed from the flexible bag, the flexible bag retains its shape and product is not caught and held in the flexible bag by folds in the flexible bag as product is being removed, as has been the situation with other hanging methods where a bag is held in place at its four corners allowing the side walls of the bag to collapse retaining product in the bag.

The following is a typical example that illustrates use of the bag hanger device and/or flexible bag of the present invention to facilitate dispensing of a granular agricultural product.

EXAMPLE

A flexible bag as shown above in FIG. 3 and FIG. 5 is filled in an inverted position through the valve assembly, e.g. through the valve in an open position, with 16 kilograms of EXPRESS 50 SG®, a paste extruded granular herbicide product of E. I. du Pont de Nemours and Company comprising tribenuron-methyl. The valve is then closed and locked in the closed position. The flexible bag containing the granular herbicide product is shipped to its destination in an appropriate shipping manner.

When the granular herbicide product is to be dispensed from the flexible bag, the flexible bag is inverted so that the closed valve is facing downward and the pocket at the top of the flexible bag is exposed. The bag hanger device shown in FIG. 1A is inserted into the pocket of the flexible bag to the end of its travel with the locking device facing in the direction of insertion. The locking device is engaged. The bag hanger device and flexible bag are then hung from a support structure within a system for dispensing flowable material such that the flexible bag is positioned above a receptacle that is composed of a part capable of mating with the valve and a handle for opening the valve. The valve on the flexible bag is mated to the receptacle, and the handle is moved to open the valve and allow the granular herbicide product to flow freely through the valve. When the supply of granular herbicide product in the flexible bag has been exhausted or the proper amount of granular herbicide product has been dispensed, the handle is returned to its original position. If the supply of flowable material has been exhausted, then the flexible bag and the bag hanger device are removed from the dispensing system.

What is claimed is:

1. A bag hanger device for holding a flexible bag containing a flowable material comprising:
   a frame having multiple sides;
   a cross-member having two ends wherein one end is attached to one side of the frame and an opposite end is unattached to the frame;
   a closing device attached to the opposite end of the cross-member;
   a locking device attached to the frame opposite the closing device and in alignment with the closing device attached to the cross-member;
   at least one hanging means attached to the cross-member for holding the bag hanger device and a flexible bag attached thereto in a dispensing system;
   wherein the bag hanger device when inserted into the flexible bag having a pocket therein with the cross-member positioned outside of the pocket and the pocket having an opening for the locking device thereby providing for engagement of the closing device with the locking device and thereby holding the flexible bag in a position to prevent collapse, wrinkling or deformation of the flexible bag.

2. The bag hanger device of claim 1 having two to five sides.

3. The bag hanger device of claim 1 having four sides.

4. The bag hanger device of claim 1 having two sides.

5. The bag hanger device of claim 1 having three sides.

6. The bag hanger device of claim 1 having five sides.

7. The bag hanger device of claim 1 wherein the flexible bag is a plastic bag or a cloth bag.

8. The bag hanger device of claim 7 wherein the flexible bag is formed from multilayered sheet material.

9. The bag hanger device of claim 8 wherein the multilayered sheet material comprises a nylon layer, a low density polyethylene layer and an ethylene vinyl acetate polymer layer.

10. The bag hanger device of claim 1 where the flowable material is a granular agricultural product.

11. The bag hanger device of claim 1 wherein the flowable material is a liquid.

12. A bag hanger device for holding a flexible bag containing a flowable material, comprising:
    a frame having multiple sides;
    a cross-member having two ends wherein one end is attached to one side of the frame and an opposite end is unattached to the frame;
    a closing mechanism device attached to the opposite end of the cross-member comprising a pivotable hook assembly which comprises a hook capable of engagement with the frame;
    at least one hanging means attached to the cross-member for holding the bag hanger device and a flexible bag attached thereto in a dispensing system;
    wherein the bag hanger device when inserted into the flexible bag having a pocket therein with the cross-member positioned outside of the pocket and the pocket having an opening to allow the hook to engage with the frame thereby providing for engagement of the hook with the frame and thereby holding the flexible bag in a position to prevent collapse, wrinkling or deformation of the flexible bag.

13. A flexible bag having a pocket therein and opposite the pocket having an outlet for dispensing a flowable material wherein the bag hanger device of claim 1 is inserted into the pocket.

14. The flexible bag of claim 13 having a dispensing means positioned in or around the outlet for dispensing the flowable material.

15. The flexible bag of claim 14 wherein the dispensing means comprises a valve assembly comprising a valve with portions thereof movable with respect to one another between an open position for dispensing the flowable material and a closed position for shutting off discharge of the flowable material and optionally capable of mating with the dispensing system in a product-specific manner.

16. The flexible bag of claim 13 wherein the flexible bag is a plastic bag or a cloth bag.

17. The flexible bag of claim 13 wherein the flexible bag is formed from multilayered sheet material.

18. The flexible bag of claim 17 wherein the multilayered sheet material comprises a nylon layer, a low density polyethylene layer and an ethylene vinyl acetate polymer layer.

19. The bag hanger device of claim 1 wherein the frame is D-shaped having a straight section with each end of the straight section connected to opposite ends of a semicircular section.

20. A flexible bag having a pocket therein and opposite the pocket having an outlet for dispensing a flowable material wherein the bag hanger device of claim 19 is inserted into the pocket.

21. A bag hanger device for holding a flexible bag containing a flowable material, comprising:
   a circular frame;
   a cross-member having two ends wherein one end is attached to one side of the circular frame and an opposite end is unattached to the circular frame;
   a closing device attached to the opposite end of the cross-member;
   a locking device attached to the circular frame opposite the closing device and in alignment with the closing device attached to the cross-member;
   at least one hanging means attached to the cross-member for holding the bag hanger device and a flexible bag attached thereto in a dispensing system;
   wherein the bag hanger device when inserted into the flexible bag having two apposing pockets therein with the cross-member and the locking device positioned outside of the two apposing pockets within an opening disposed between the two apposing pockets thereby providing for engagement of the closing device with the locking device and thereby holding the flexible bag in a position to prevent collapse, wrinkling or deformation of the flexible bag.

22. A flexible bag having two apposing pockets therein and opposite the two apposing pockets having an outlet for dispensing a flowable material wherein the bag hanger device of claim 21 is inserted into the two apposing pockets of the flexible bag.

23. A flexible bag hanging system, comprising: a flexible bag and a bag hanger device,
   the flexible bag comprising at least one pocket disposed at the top of the flexible bag, an outlet disposed at the bottom of the flexible bag for dispensing a flowable material, and having a multi-sided, circular-shaped or D-shaped configuration;
   the bag hanger device comprising a frame having a configuration capable of insertion in the at least one pocket of the flexible bag, a cross-member having two ends wherein one end is attached to one side of the frame and an opposite end is unattached to the frame, a closing device attached to the opposite end of the cross-member, a locking device attached to the frame opposite the closing device and in alignment with the closing device attached to the cross-member; and
   the frame being disposed within the pocket with the cross-member positioned outside of the pocket and the locking device disposed through an opening for engagement with the closing device.

* * * * *